2,773,759
PRODUCTION OF REFRACTORY METALS

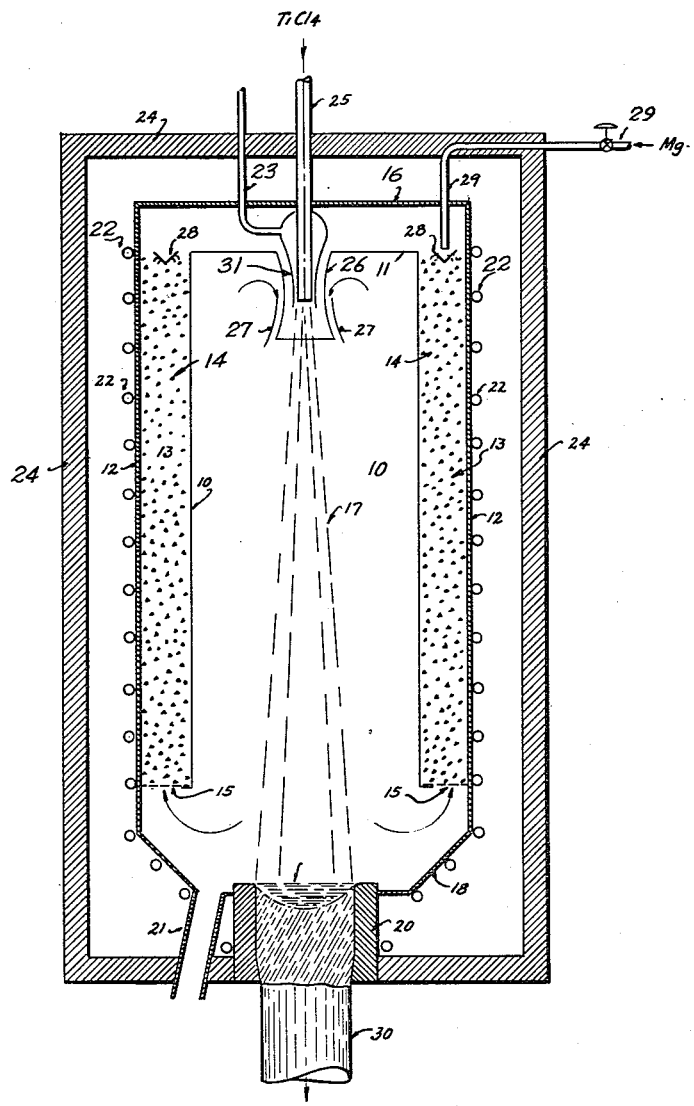
INVENTOR.
RALPH S. HOOD.
BY

Ralph S. Hood, Marblehead, Mass., assignor to Monsanto Chemical Company, St. Louis, Mo., a corporation of Delaware Application February 19, 1952, Serial No. 272,378

5 Claims. (Cl. 75—84.5)

This invention relates to the production of Group IVa metals and more particularly to the production of such metals in a high state of purity.

A principal object of the present invention is the provision of an improved process whereby the production of Group IVa metals may be efficiently and cheaply carried out. Another object is to provide an improved process for the production of the said metals which results in great savings of energy in the manufacture thereof.

The present invention relates to and is an improvement upon the invention described and claimed in Findlay application Serial No. 200,606, filed December 13, 1950. According to the Findlay invention a Group IVa tetrahalide in the vapor form is reacted with the vapor of a reducing metal, for example, a metal of the alkali or the alkaline earth group metals: sodium and magnesium. In the practice of the Findlay invention, Group IVa metals are produced from the corresponding halides and preferably the chlorides by mixing said vaporous chlorides with the vapor of a reducing metal, the reaction being characterized by an extremely high temperature. In the Findlay invention the metal may be recovered in the form of a solid ingot, if desired, which is substantially free of the by-product reducing metal halides formed in the process by reason of the fact that said by-product halides are formed in the vapor state.

In accordance with the present invention I have discovered that when said Findlay process is carried out with a reducing metal of the group: sodium or magnesium, or mixtures thereof, the heat energy required in order to vaporize said reducing metal may be completely recovered directly from the products of the process. Furthermore, vaporization of the reducing metal may be practically achieved by rectification of said by-product vaporous chlorides and said liquid reducing metal or metals. Preferably said rectification is carried out in a zone forming a part of said reaction zone.

The reduction of the halide may be carried out either by means of a single reducing metal which may preferably be sodium or magnesium or a mixture of metals may be employed. By employing mixtures of metals the resulting mixed chlorides are obtained in a mixture having a lower melting point than the pure metal chlorides. For example, by suitably proportioning the metals, sodium and magnesium, a eutectic mixture of the sodium chloride and magnesium chloride melting at 430° C. may be produced. Such lower melting point considerably simplifies by reason of the reduced melting point, the handling of the by-product salt produced in the process.

All or part of the sodium, the magnesium or any suitable mixture thereof may be supplied in liquid form to the reactor and vaporized therein. Where part of said reducing metal or metals is supplied in vapor form, somewhat more heat is available for vaporizing that portion of said reducing metal supplied in liquid form. Insofar as ease of vaporization is concerned, I prefer to supply all of the magnesium for reaction as liquid magnesium. When sodium is additionally to be used, it is desirable to vaporize the sodium metal externally of the reactor and to supply the sodium vapors to the torch in the manner described in said Findlay application.

For a more complete description of the present invention, reference will be made to the following description when read in connection with the accompanying drawing.

In the drawing the single figure shows, in sectional view, the reaction chamber in which numeral 10 indicates a cylindrical wall defining the reaction zone. The cylindrical wall is provided with a top 11. Surrounding the cylinder 10 is an annular chamber 13 formed by a second cylindrical wall 12, spaced some distance therefrom. Annular chamber 13 is provided with vapor-liquid contact means such, for example, as irregular particles, Berl saddles or a series of bubble plates of conventional construction. These may be formed of refractory metals such as titanium or molybdenum. Where loose packing material is employed as the liquid-vapor contact means, it may be supported upon a screen or perforated plate 15. The upper end of the cylinder formed by wall 12 is provided with a cover 16 spaced a distance from plate 11. The lower end of cylinder 12 is provided with a sloping bottom 18 and also with an ingot mold 20 located therein. It is also provided with a salt exit pipe 21. Upon the outer surface of cylinder 12 there is provided cooling means 22 which may take the form of metal tubes through which a liquid metal such as sodium or magnesium may be passed. Such means for cooling during reaction may also be utilized to heat the reaction zone when it is desired to start the process.

Surrounding the outer wall 12 and the cooling tubes 22, is a heat-insulating jacket 24.

A supply conduit for titanium tetrachloride is provided at 25, the end of which terminates within a venturi throat or nozzle 26, the latter being attached to and centrally located in cover plate 11. Deflecting vanes or ring 27 are provided for effecting additional vapor circulation within the reaction zone.

A circular distributing trough 28 is arranged above the packing 13, said trough being supplied with liquid magnesium by means of pipe 29 connecting with an outside source of the metal, which source is not shown.

Should it be desired to use sodium metal in addition to the magnesium metal as a reducing agent in the present process, such sodium is preferably introduced in the vapor state by means of a separate nozzle. Such separate nozzle is indicated by numeral 31 and is arranged to discharge sodium vapor through an orifice located centrally within nozzle 26. Nozzle 31 is supplied with sodium vapor by means of pipe 23.

The titanium ingot is indicated by numeral 30 and is formed in mold 20. It is arranged so that it may be withdrawn, which is done at a rate such that the growing end thereof is maintained approximately at the same level with respect to the position of the flame.

The operation of the described apparatus is carried out as follows. The reaction-rectification zone is freed of all reactive gases, such as air, by evacuation and replacement with an inert gas which may be argon. Heat is applied to the zone by passing a molten metal such as sodium through coils 22 and the temperature thereby raised to about the boiling point of magnesium, which is 1120° C. Vaporized titanium tetrachloride is admitted by means of pipe 25 and molten magnesium at a temperature of about 1103° C. is admitted by means of pipe 29. The liquid magnesium flows into distributor trough 28 and then down over the packing 14 contained in annular space 13. By contact with the heated packing the magnesium is vaporized, the vapors thereof entering the space between plates 11 and 16 and thence entering the space defined by the venturi nozzle 26. At this point the magnesium vapors are mixed and reacted with the titanium tetrachloride vapors, the latter entering through pipe 25.

The employment of a venturi nozzle 26, supplied with titanium chloride vapors by means of pipe 25, results in the development of a pressure differential sufficient to overcome the pressure drop of the magnesium chloride vapors through the packing contained in channel 13.

The reaction between the titanium tetrachloride vapors and magnesium vapors results in the formation of titanium metal and magnesium chloride. The reaction so occurring is a highly exothermic one with temperatures reaching in the neighborhood of 2000° C. and thus well above the melting point of the metal formed during the reaction. The metal formed in the flame is formed in the molten state and in relatively small particles which are carried downwardly by the velocity of the hot gases of the flame. These molten particles impinge and adhere upon the liquid upper surface 19 of ingot 30. In this manner the ingot is formed. In order to maintain the upper surface 19 of ingot at substantially the same position in mold 30, the ingot is gradually drawn downwardly into and through the mold.

Simultaneously with the formation of titanium there is also formed the corresponding chloride of the reducing metal, namely magnesium and/or sodium chloride and by reason of the prevailing high temperatures this salt is formed in the vapor state. The vaporous salt passes into annular space 13 where it comes into contact with packing material 14 contained therein. It also comes into contact with the down-flowing liquid magnesium, with the result that rectification with vaporization of the magnesium takes place therein. The magnesium vapors, at a temperature of 1120° C., pass into the burner or torch formed by venturi throat 26. Liquid magnesium chloride, which is formed by the condensation of the vapors, flows downwardly over the packing in a direction counter to the entering magnesium chloride vapors and leaves the reaction zone by means of pipe 21.

Since all of the titanium metal generated in the flame does not adhere to the ingot surface, some non-adhering titanium is collected in the reaction zone as a finely divided powder. Such powder is carried out with the molten salt flowing through pipe 21. It may be recovered from the molten salt by several means, preferably by the means described and claimed in application Serial No. 252,564, filed October 22, 1951, of which application the present inventor is a coinventor. In said application the titanium powder is separated from the liquid salt by filtration. Adhering salt is removed from the powder by washing with aluminum chloride. If desired in the operation of the present process, all of the titanium may be recovered in the form of a powder rather than in the ingot form, in which event the ingot is maintained in a fixed position in the mold. In this event the titanium ingot grows to such an extent that the cooling means associated with the mold is no longer sufficient to congeal the molten titanium impinging upon the upper surface thereof with the result that such titanium flows into the salt, is congealed and removed with such salt.

In general, when utilizing an apparatus, such as that described, which is provided with efficient heating insulation, sufficient heat is available from the reaction to volatilize all of the magnesium chloride formed in the process so that the metal may be recovered in substantially pure form. However, with less efficient insulation and, accordingly, a greater heat loss, and particularly where the reaction zone is provided with cooling means 22, shown in the drawing, condensation of the by-product salt occurs and the so-formed liquid salt collects in the bottom of the zone, as already described. The removal of heat from the reaction zone in the manner shown above results in the formation of liquid salt which contacts with and in part flows over both walls defining space 13, thus cooling the same and protecting the material thereof against the very high temperatures produced by flame 17. The upper part of wall 10 is in contact with the reducing metal, thus both ends as well as the middle of the wall or cylinder 10 defining the reaction zone are cooled by contact with either liquid metal or salt or mixtures thereof.

By directing the flame downwardly substantially all of the liquid titanium particles are separated from the vaporous chlorides during the change in direction thereof prior to entry of the same into the fractionating zone.

Having thus described my invention, what I claim is:

1. A process for producing a Group IVa metal selected from the group consisting of zirconium and titanium which comprises contacting the tetrachloride of said Group IVa metal with a gaseous reducing metal selected from the group consisting of sodium and magnesium in a reaction zone at a temperature higher than the boiling point of the chlorides of said reducing metal but below the boiling point of said Group IVa metal whereby condensed Group IVa metal and vaporous chlorides of said reducing metal are formed, passing liquid reducing metal and said vaporous chlorides into a heat exchange zone in heat exchange relationship with each other whereby said liquid reducing metal is vaporized and said vaporous chlorides are condensed, and passing said vaporized reducing metal into the aforesaid reaction zone.

2. The process of claim 1 wherein the Group IVa metal is titanium and wherein the reducing metal is sodium.

3. The process of claim 1 wherein the Group IVa metal is zirconium and wherein the reducing metal is sodium.

4. A process for producing metallic titanium which comprises contacting titanium tetrachloride with sodium vapors in a reaction zone at a temperature higher than the boiling point of sodium chloride but below the boiling point of titanium whereby condensed titanium and vaporous sodium chloride are formed, passing vaporous sodium chloride upwardly into a heat exchange zone circumferentially surrounding said reaction zone, introducing molten sodium downwardly into said heat exchange zone and in direct heat exchange with said vaporous sodium chloride whereby the molten sodium is vaporized and the vaporous sodium chloride is liquefied, removing liquid sodium chloride from the lower portion of said heat exchange zone, removing sodium vapors from the upper portion of the said heat exchange zone, and passing said sodium vapors into the aforesaid reaction zone.

5. A process for producing metallic titanium which comprises contacting titanium tetrachloride with sodium vapors in a reaction zone maintained at a temperature between the melting point and the boiling point of titanium, whereby liquid titanium and gaseous sodium chloride are formed, separating said gaseous sodium chloride from said liquid titanium introducing said gaseous sodium chloride upwardly into a heat exchange zone circumferentially surrounding said reaction zone, introducing molten sodium downwardly into said heat exchange zone and in direct heat exchange with said gaseous sodium chloride whereby the molten sodium is vaporized and the gaseous sodium chloride is liquified, removing liquid sodium chloride from the lower portion of said heat exchange zone, removing sodium vapors from the upper portion of said heat exchange zone and passing said sodium vapors into the aforesaid reaction zone.

References Cited in the file of this patent

UNITED STATES PATENTS

| | | |
|---|---|---|
| 1,306,568 | Weintraub | June 10, 1919 |
| 2,091,087 | Wempe | Aug. 24, 1937 |
| 2,564,337 | Maddex | Aug. 14, 1951 |
| 2,441,594 | Ramseyer | May 18, 1948 |
| 2,618,549 | Glasser et al. | Nov. 18, 1952 |
| 2,647,826 | Jordan | Aug. 4, 1953 |

FOREIGN PATENTS

| | | |
|---|---|---|
| 253,161 | Great Britain | June 7, 1926 |
| 642,500 | Great Britain | Sept. 6, 1950 |
| 296,867 | Germany | Mar. 13, 1917 |
| 505,801 | Belgium | Sept. 29, 1951 |

OTHER REFERENCES

Journal of Metals, April 1950, pages 634–640.